(No Model.)

L. HOLT.
PNEUMATIC TIRE.

No. 509,903.  Patented Dec. 5, 1893.

WITNESSES:  INVENTOR.
Leopold Holt
per Robt. Cd. Phillips
Attorney.

THE NATIONAL LITHOGRAPHING COMPANY,
WASHINGTON, D. C.

UNITED STATES PATENT OFFICE.

LEOPOLD HOLT, OF FRANKFORT-ON-THE-MAIN, GERMANY.

PNEUMATIC TIRE.

SPECIFICATION forming part of Letters Patent No. 509,903, dated December 5, 1893.

Application filed July 6, 1893. Serial No. 479,763. (No model.) Patented in England December 8, 1892, No. 22,551.

*To all whom it may concern:*

Be it known that I, LEOPOLD HOLT, a subject of the Queen of Great Britain, temporarily residing at Frankfort-on-the-Main, in the Empire of Germany, have invented a new and useful Improvement in Pneumatic Tires, (for which I have obtained a patent in Great Britain, No. 22,551, bearing date the 8th of December, 1892,) of which the following is a specification.

My invention relates to an improved method of attaching and securing the covers of pneumatic tires to wheel rims, and it consists in placing in pockets formed in the edges of the cover circumferentially elastic hoops or rings adapted by their elasticity to grip the wheel rim and capable of being rendered circumferentially rigid when in place on the rim by means of a suitable locking device, the object being to fix the cover to the wheel rim so that while it can readily and easily be detached therefrom or attached thereto, it is when fixed to the rim secured thereto in an efficient and reliable manner. I attain this object by the construction shown in the accompanying drawings, in which—

Figure 1:
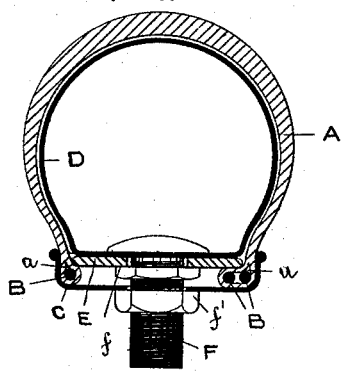
Figure 2:
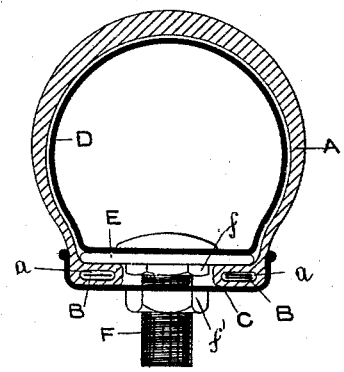
Figure 3:
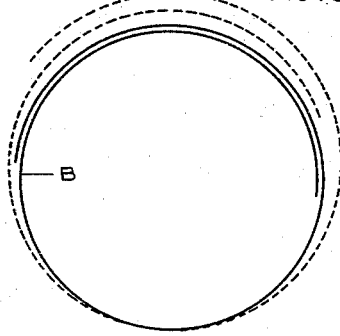
Figure 4:
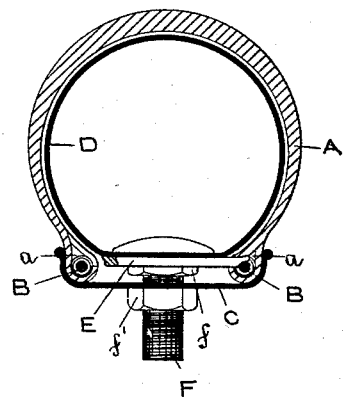
Figures 5, 7:
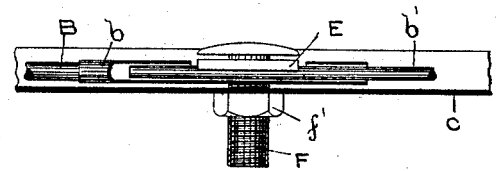
Figure 6:
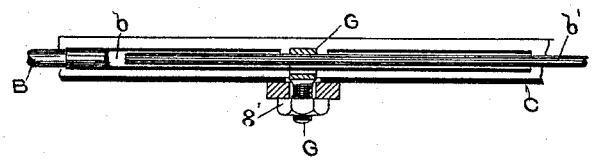

Figure 1 is a view in transverse section of a pneumatic tire embodying my invention in which the elastic hoops or rings are made of round wire. Fig. 2 is a view in transverse section of a pneumatic tire in which the elastic hoops or rings are made of flat strips or bands. Fig. 3 is a diagrammatic view showing the construction and action of the elastic hoops or rings. Fig. 4 is a view in transverse section of a pneumatic tire embodying my invention in which one end of the elastic hoop or ring telescopes within the other; and Figs. 5, 6 and 7 are broken views in longitudinal section showing several devices for locking the two ends of the elastic hoop or ring together and to the wheel rim to render the said hoop or ring longitudinally rigid.

Similar parts are marked with like letters of reference throughout the several views.

The cover A of the tire is made of rubber reinforced with canvas in the well-known manner, and it is formed of an arch-shape in cross section. In each edge of the cover is formed a pocket $a$ in which is placed a circumferentially elastic hoop or ring B. The rim C is made of a flat grooved section as shown or of any other similar section. The air tube D is of the usual construction and is provided with any suitable form of valve for inflation and deflation.

The elastic hoops or rings B, B, may be made either of round spring steel wire as shown by Figs. 1 and 4, or of flat ribbon or band spring steel as shown by Fig. 2. The ends of the wire or band forming the hoops or rings overlap each other as shown by Fig. 3, and the normal diameter of each hoop or ring is considerably smaller than the diameter of the wheel rim measured at the bottom of the groove thereof, so that it naturally grips or closes on the rim by its own elasticity, and has to be sprung open to get it over the edge of the wheel rim.

To lock the overlapping ends of the hoops or rings together and to the wheel rim to render them circumferentially rigid and to prevent them creeping on the wheel rim, a clamping plate E is employed through which the shank F of the valve passes and to which it is fixed by the nut $f$ employed to fix the shank F of the valve to the air tube D, the said clamping plate E being drawn down to bind or clamp the overlapping ends of the hoops or rings B together and to the wheel rim by means of a nut $f'$ threaded on to the shank F of the valve and bearing against the inner face of the wheel rim C as shown by Figs. 1, 2 and 4.

As a modification the ends of each elastic hoop or ring B may be made to telescope one within the other as shown by Figs. 4, 5, 6 and 7 in which construction round wire is used and a piece of tube forming a socket $b$ is fixed to one end of each wire for the other end $b'$ to slide into. To lock the two ends of the elastic hoop or ring together to make it circumferentially rigid a clamp plate F as hereinbefore described may be employed, a part of the socket $b$ being cut away to allow the said clamp plate F to rest on the end $b'$ of the wire in the socket $b$ as shown by Figs. 4 and 5 and thus clamp the two ends together and to the wheel rim. As an alternative method an eye bolt G may be passed over the socket $b$ a part of which is cut away as shown by Fig. 6 so that when the said bolt is drawn down by the nut $g$ threaded thereon it clamps the end $b'$ of the elastic hoop to the socket end $b$ thereof, and both to the wheel rim.

Another method of rendering the hoops or rings circumferentially rigid is to fix to or form on the socket $b$ a short socket $b^2$ at right angles to the socket $b$. The socket $b^2$ is drilled and tapped to receive a set screw G which when screwed into the said socket impinges on the end $b'$ of the elastic hoop or ring and so clamps it to the socket end $b$ thereof. The sockets $b^2$, $b^2$, are passed through holes in the wheel rim which thus prevents the hoops or rings B, B, creeping, and caps B' are screwed on to the ends of the sockets $b^2$ to lock them to the wheel rim and close the holes therein.

I wish it to be particularly understood that I do not limit myself to the precise details of construction hereinbefore described and illustrated by the accompanying drawings, but that I hold myself at liberty to make such changes and alterations as fairly fall within the spirit and scope of my invention.

I am aware that prior to the date of my invention bands or wires had been used for fixing and securing the edges of the covers of pneumatic tires to wheel rims, and I do not therefore claim such broadly; but What I do claim as my invention, and desire to secure by Letters Patent, is—

1. In a pneumatic tired wheel, the combination of a wheel rim; of a cover having pockets at its edges; and of two circumferentially elastic hoops or rings the ends of which overlap or telescope one within the other and which are clamped together and to the wheel rim by a clamp plate, as set forth.

2. In a pneumatic tired wheel, the combination of a wheel rim of a flat grooved section; of a cover having pockets in its edges; of two circumferentially elastic hoops or rings each made of a length of steel wire the ends of which overlap; of a clamp plate fixed to the stem of the inflation valve, and of an air tube for inflating the tire, all combined, arranged and operating as and for the purpose set forth.

3. In a pneumatic tired wheel, the combination of a wheel rim of a flat-grooved shape in cross section; of a cover having pockets in its edges; of two circumferentially elastic hoops or rings each made of a length of steel ribbon or band the ends of which overlap; of a clamp plate fixed to the stem of the inflation valve, and of an air tube for inflating the tire, all combined arranged and operating, as and for the purpose set forth.

4. In a pneumatic tired wheel, the combination of a wheel rim of a flat-grooved shape in cross section; of a cover having pockets in its edges; of two circumferentially elastic hoops or rings made of a length of steel wire the ends of which telescope one within the other; of a clamp plate fixed to the stem of the inflation valve, and of an air tube for inflating the tire, as set forth.

5. In a pneumatic tired wheel, the combination of a wheel rim of a flat-grooved shape in cross section; of a cover having pockets in its edges; of two circumferentially elastic hoops or rings made of a length of steel wire the ends of which telescope one within the other; of eye bolts adapted to clamp the ends of the elastic hoops or rings together and to the wheel rim, and of an air tube for inflating the tire, as set forth.

6. In a pneumatic tired wheel, the combination of a wheel rim of a flat-grooved shape in cross section; of a cover having pockets in its edges; of two elastic hoops or rings, each having a socket formed on or fixed to one end in which the other end slides; of sockets fixed at right angles to the aforesaid sockets; of set screws threaded into the said sockets, and of an air tube for inflating the tire, as set forth.

LEOPOLD HOLT.

Witnesses:
W. H. JAMES,
G. T. CLARK,
*Both of 70 Chancery Lane.*